United States Patent Office.

HIRAM W. CLOUD, OF EVANSVILLE, INDIANA.

Letters Patent No. 107,877, dated October 4, 1870.

IMPROVEMENT IN MEDICAL COMPOUNDS.

The Schedule referred to in these Letters Patent and making part of the same

*To all whom it may concern:*

Be it known that I, HIRAM W. CLOUD, of Evansville, in the county of Vanderburg and State of Indiana, have invented a new and useful Improvement in Medical Compound; and I do hereby declare that the following is a full, clear, and exact description thereof, which will enable others skilled in the art to make and use the same.

This invention relates to a new and useful improvement in a compound to be used as a medicine for the cure of disease and as a tonic, and consists in a combination of the ingredients hereinafter mentioned, substantially in the proportions and manner specified.

In carrying out my invention and discovery I make use of the following ingredients for making one hundred gallons of my compound, viz:

Wild cherry bark, twelve pounds; wild potato, (wild jalap,) ten pounds; blood-root, five pounds; mandrake, two pounds; golden seal, five pounds; pyrophosphate of iron, two pounds.

The above-mentioned barks and roots are reduced to a uniform coarse powder and thoroughly mixed, (dry,) and then moistened with Cologne spirits at sixty-five degrees gravity and packed in a wooden percolator, and then the same Cologne spirits are added until the percolate amounts to ninety-two gallons. The two pounds of pyrophosphate of iron dissolved in one gallon of the percolate are added, after which the following following flavoring tinctures are added, viz:

Simple sirup, (U. S. P.) six gallons; tincture of orange peel, one-half gallon; tincture of lemons, one-half gallon; tincture calamus and cloves, one-half gallon; tincture coriander, one-fourth gallon; sugar coloring, (caramel,) one-fourth gallon. Total, one hundred gallons.

The compound is now ready for final filtration, (which may be accomplished by any of the well-known modes,) after which it is ready for bottling and use.

This compound is used as a tonic in cases of general debility, dyspepsia, and as a general invigorator of the system.

Having thus described my invention,

I claim as new and desire to secure by Letters Patent—

The above-described medical compound, substantially as and for the purposes set forth.

HIRAM W. CLOUD.

Witnesses:
ABRAHAM J. JAGOR,
OSCAR T. BENNETT.